(12) United States Patent
Zaman et al.

(10) Patent No.: US 12,513,151 B2
(45) Date of Patent: Dec. 30, 2025

(54) DYNAMIC AND SECURE PERMISSION ROLE GENERATION FOR CLOUD COMPUTING ENVIRONMENTS

(71) Applicant: Capital One Services, LLC, McLean, VA (US)

(72) Inventors: Saira Zaman, Frisco, TX (US); Sagar Ali, Frisco, TX (US); Amy Shah, Chicago, IL (US); Mahantesh Galatagimath, Glen Allen, VA (US); Jonatan Bernal, Voorhees, NJ (US); Omprakash Vinjamuri, Aldie, VA (US); Harish Upendra Patel, Hackettstown, NJ (US); John Taormina, Vineland, NJ (US); Ishu Gupta, Mckinney, TX (US); Mohammad Hussein Banihani, Dunn Loring, VA (US); Ali Hussein A Ravji, Glen Allen, VA (US); Kimiko Hirano, Richmond, VA (US); Jiyang Xu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 322 days.

(21) Appl. No.: 18/311,364

(22) Filed: May 3, 2023

(65) Prior Publication Data
US 2024/0372871 A1 Nov. 7, 2024

(51) Int. Cl.
*H04L 9/40* (2022.01)

(52) U.S. Cl.
CPC ............ *H04L 63/105* (2013.01); *H04L 63/20* (2013.01)

(58) Field of Classification Search
CPC .............................. H04L 63/105; H04L 63/20
See application file for complete search history.

(56) References Cited

U.S. PATENT DOCUMENTS

| | | | |
|---|---|---|---|
| 9,934,477 B1 * | 4/2018 | Hansen | G06F 11/0793 |
| 11,914,731 B1 * | 2/2024 | Velickovic | G06F 21/6218 |
| 2015/0058460 A1 | 2/2015 | Seago | |
| 2019/0342397 A1 * | 11/2019 | Laibson | H04L 9/0894 |
| 2021/0084040 A1 * | 3/2021 | Sakowicz | H04L 63/1425 |
| 2022/0286465 A1 * | 9/2022 | Du | H04L 63/08 |
| 2023/0401232 A1 * | 12/2023 | Cseri | G06F 21/6218 |

\* cited by examiner

*Primary Examiner* — Gil H. Lee
(74) *Attorney, Agent, or Firm* — Harrity & Harrity, LLP

(57) ABSTRACT

In some implementations, a device may generate, based on a deployment pattern associated with a task that is associated with the cloud computing environment, one or more least privilege roles associated with the task, wherein the one or more least privilege roles indicate one or more security permissions associated with performing the task. The device may store, in a data structure, the one or more least privilege roles in association with the task for on-demand deployment in association with the task. The device may receive an indication to perform the task. The device may obtain, from the data structure and based on receiving the indication to perform the task, the one or more least privilege roles associated with the task. The device may cause, in accordance with the one or more least privilege roles, the task to be performed in the cloud computing environment.

20 Claims, 6 Drawing Sheets

DYNAMIC AND SECURE PERMISSION ROLE GENERATION FOR CLOUD COMPUTING ENVIRONMENTS

BACKGROUND

Cloud computing is a model for delivering computing resources over a network. Cloud computing environments allow devices to access shared pools of configurable computing resources, such as servers, storage, and applications, on-demand, without the need for direct management or ownership of the underlying infrastructure. Cloud computing environments may be associated with a variety of services, such as infrastructure-as-a-service (IaaS), platform-as-a-service (PaaS), and/or software-as-a-service (SaaS), among other examples.

SUMMARY

Some implementations described herein relate to a system for dynamic and secure permission role generation for a cloud computing environment. The system may include one or more memories and one or more processors communicatively coupled to the one or more memories. The one or more processors may be configured to generate one or more least privilege roles associated with a task associated with the cloud computing environment based on a deployment pattern associated with the task, wherein the one or more least privilege roles are associated with a rule set indicating one or more security permissions associated with performing the task, and wherein the deployment pattern indicates one or more previous occurrences of the task and the one or more least privilege roles are based on resources or actions associated with the one or more previous occurrences. The one or more processors may be configured to store, in a data structure, the one or more least privilege roles in association with the task for on-demand deployment in association with the task. The one or more processors may be configured to receive, via a serverless computing engine, an indication to perform the task. The one or more processors may be configured to obtain, from the data structure and based on receiving the indication to perform the task, the one or more least privilege roles associated with the task. The one or more processors may be configured to cause, in accordance with the one or more least privilege roles, the task to be performed.

Some implementations described herein relate to a method for dynamic and secure permission role generation for a cloud computing environment. The method may include generating, by a device and based on a deployment pattern associated with a task that is associated with the cloud computing environment, one or more least privilege identity and access management (IAM) roles associated with the task, wherein the one or more least privilege IAM roles indicate one or more security permissions associated with performing the task. The method may include storing, by the device and in a data structure, the one or more least privilege IAM roles in association with the task for on-demand deployment in association with the task. The method may include receiving, by the device, an indication to perform the task. The method may include obtaining, from the data structure and based on receiving the indication to perform the task, the one or more least privilege IAM roles associated with the task. The method may include causing, by the device and in accordance with the one or more least privilege IAM roles, the task to be performed in the cloud computing environment.

Some implementations described herein relate to a non-transitory computer-readable medium that stores a set of instructions. The set of instructions, when executed by one or more processors of a device, may cause the device to generate one or more roles associated with a task associated with a cloud computing environment based on a deployment pattern associated with the task. The set of instructions, when executed by one or more processors of the device, may cause the device to cache, in a data structure, the one or more roles in association with the task. The set of instructions, when executed by one or more processors of the device, may cause the device to receive, via a serverless computing engine, an indication to perform the task. The set of instructions, when executed by one or more processors of the device, may cause the device to obtain, from the data structure and based on receiving the indication to perform the task, the one or more roles associated with the task. The set of instructions, when executed by one or more processors of the device, may cause the device to provide, to the serverless computing engine, an indication of the one or more roles to cause the task to be performed in accordance with the one or more roles.

DETAILED DESCRIPTION

Figure 1A:
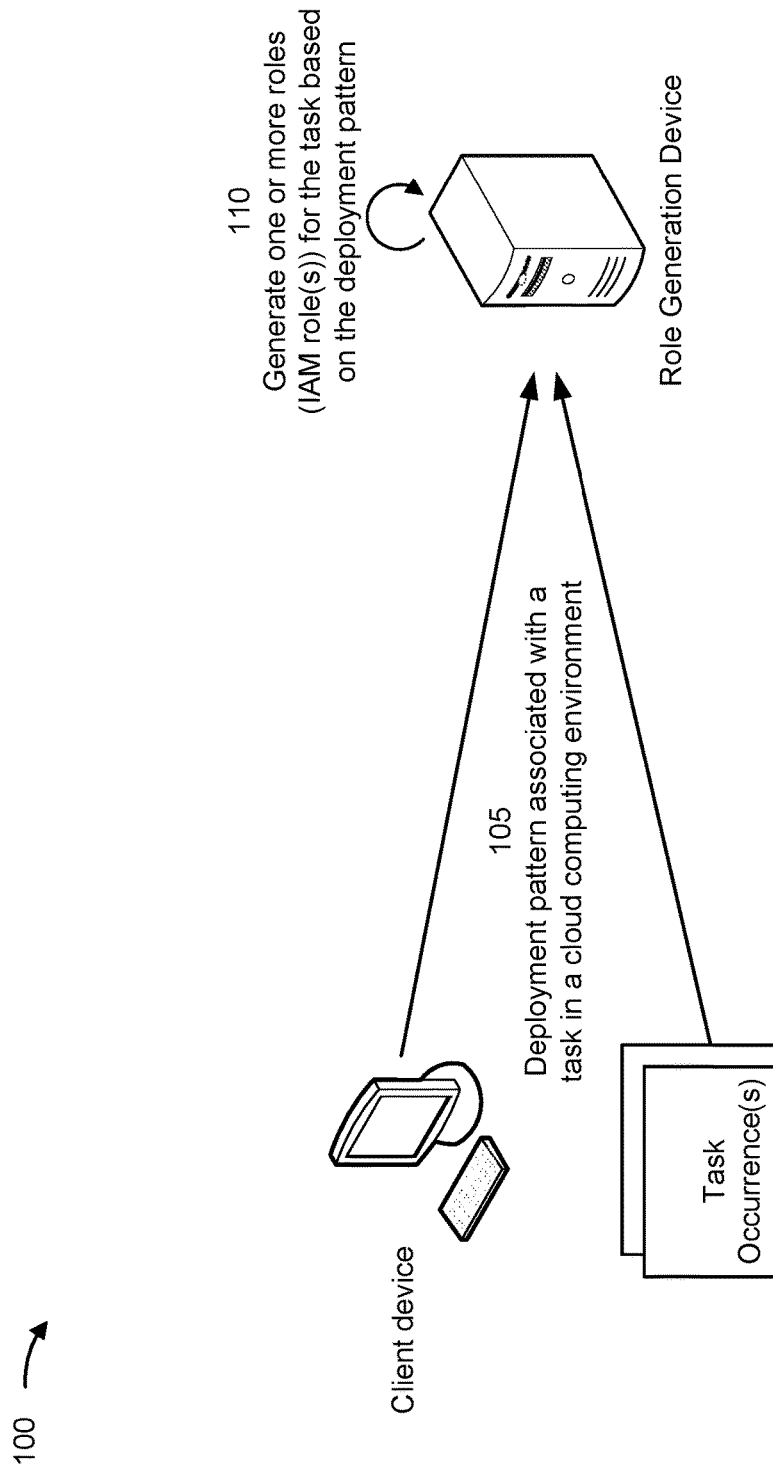
FIGS. 1A-1C are diagrams of an example associated with dynamic and secure permission role generation for cloud computing environments, in accordance with some embodiments of the present disclosure.

The following detailed description of example implementations refers to the accompanying drawings. The same reference numbers in different drawings may identify the same or similar elements.

Cloud computing environments allow devices to access shared pools of configurable computing resources, such as servers, storage, and applications, on-demand, without the need for direct management or ownership of the underlying infrastructure. In the context of cloud computing, a task may refer to a specific unit of work that is performed by a cloud-based system or application. Tasks may range from simple operations, such as data retrieval or data storage, to more complex processes, such as machine learning or analytics. A task may be initiated by a user device or an application, and the task may be executed by the cloud infrastructure. Tasks may be executed in parallel and asynchronously, meaning that multiple tasks can be performed simultaneously without blocking each other. This allows for efficient use of resources and fast completion of tasks.

In some cases, an account (e.g., with a cloud computing service) and/or a task may be associated with one or more security permissions. A security permission may refer to access controls that are put in place to ensure the confidentiality, integrity, and/or availability of data and resources in a cloud computing environment. One example of a security permission is an identity and access management (IAM) role used for Amazon Web Services (AWS)® (e.g., other cloud providers may use different terminology of the security permissions and/or roles). An IAM role may be a set of permissions that determine what actions a user or service (e.g., an account or an application) can perform within a given cloud computing resource or service. In some cases, an IAM role may be assigned to a cloud resource or service (e.g., a cloud instance, a lambda function, a container, or a bucket) and/or to accounts and services that communicate with cloud computing resources or services.

In some examples, one or more security permissions may be created for and/or granted to an account or a cloud resource or service. However, the one or more security permissions (e.g., an IAM role) may not be persistent. For example, the one or more security permissions may provide temporary security credentials to enable an account or cloud resource to access allowed resources or services and/or to perform allowed actions (e.g., as indicated by the one or more security permissions) for a duration of a session. As a result, the one or more security permissions (e.g., an IAM role) may need to be created or defined for each session, thereby consuming processing resources, network resources, computing resources, and/or memory resources, among other examples, associated with creating, generating, and/or communicating the one or more security permissions for each session.

Additionally, there may be no regulations or processes in place for defining how or when a security permission and/or IAM role is to be generated or granted. For example, for different sessions, different security permissions and/or IAM roles may be used. This may result in security permissions and/or IAM roles being associated with a task or service and granting access to resources and/or actions that are broader than needed to perform the task or service. This may introduce security risks because an account or application may be enabled to access additional resources or services in the cloud computing environment and may perform unauthorized actions using the additional resources or services. For example, an IAM role may be created that grants permission to access a cloud resource or service that is not needed for an account to perform a task. As a result, a user associated with the account may perform an action or access a service that the user is not authorized to perform or access. Because the IAM roles are not persistent and may be created frequently and in an unregulated manner, it may be difficult to control access to unauthorized cloud resources and/or services for different tasks, thereby reducing the security associated with the cloud resources and/or services.

Some implementations described herein enable dynamic and secure security permission and/or role (e.g., IAM role) generation for cloud computing environments. For example, a device (e.g., a role generation device) may generate one or more least privilege roles associated with a task in the cloud computing environment. As used herein, a "least privilege" role may refer to an IAM role or security permission(s) that grants only the minimum access necessary for a user or system to perform a specific task or function. For example, the device may determine the least amount of access rights and permissions associated with performing the task.

In some implementations, the device may generate the one or more least privilege roles based on a deployment pattern associated with the task. For example, the deployment pattern may indicate resources and/or services (e.g., in the cloud computing environment) that were accessed during previous task occurrences. Additionally, or alternatively, the deployment pattern may indicate one or more rules associated with defining the resources or services to be available for the least privilege role associated with the task. For example, the one or more rules may be based on a user input (e.g., defining the resources or services or requesting the resources or services).

The device may store, in a data structure, the one or more least privilege roles in association with the task for on-demand deployment in association with the task. For example, the device may cache one or more least privilege IAM roles associated with the task to be available for retrieval by a serverless framework associated with performing the task. A serverless framework may be a way to build and run applications and services without having to manage infrastructure. For example, a cloud provider is responsible for managing and scaling the servers for the user. A client device may simply upload code, and the cloud provider will automatically run and scale infrastructure in response to incoming requests. This eliminates the need for an entity to provision and manage servers, thereby reducing a cost and complexity associated with running and/or managing the cloud computing environment.

For example, the device may receive, via a serverless computing engine, an indication to perform the task. The device may obtain, from the data structure and based on receiving the indication to perform the task, the one or more least privilege roles associated with the task. The device may provide, to the serverless computing engine, an indication of the one or more least privilege roles associated with the task. This may enable the task to be performed in accordance with the one or more least privilege roles. For example, the roles (e.g., a least privilege IAM role) may be dynamically generated or provided when a task is requested to be performed via the serverless cloud computing framework. The roles (e.g., a least privilege IAM role) may be retrieved from stored roles (e.g., from a cache) by the serverless cloud computing framework, where the stored roles are systematically generated for least privilege by the device, as described in more detail elsewhere herein.

As a result, the device conserves processing resources, network resources, computing resources, and/or memory resources, among other examples, that would have otherwise been used for creating, generating, and/or communicating one or more security permissions and/or IAM roles for each session associated with a cloud computing environment. Additionally, the systematic generation of a role by the device ensures that only least privileges are granted for the role. Because the device may store the role to be made available each time the task is requested to be performed, the device may ensure that least privileges are granted for performing the task each time the task is performed. This improves security associated the task and/or the cloud computing environment because the device may ensure that permissions and/or control access are not granted for performing a task that are not actually needed for performing that task.

Figure 1B:
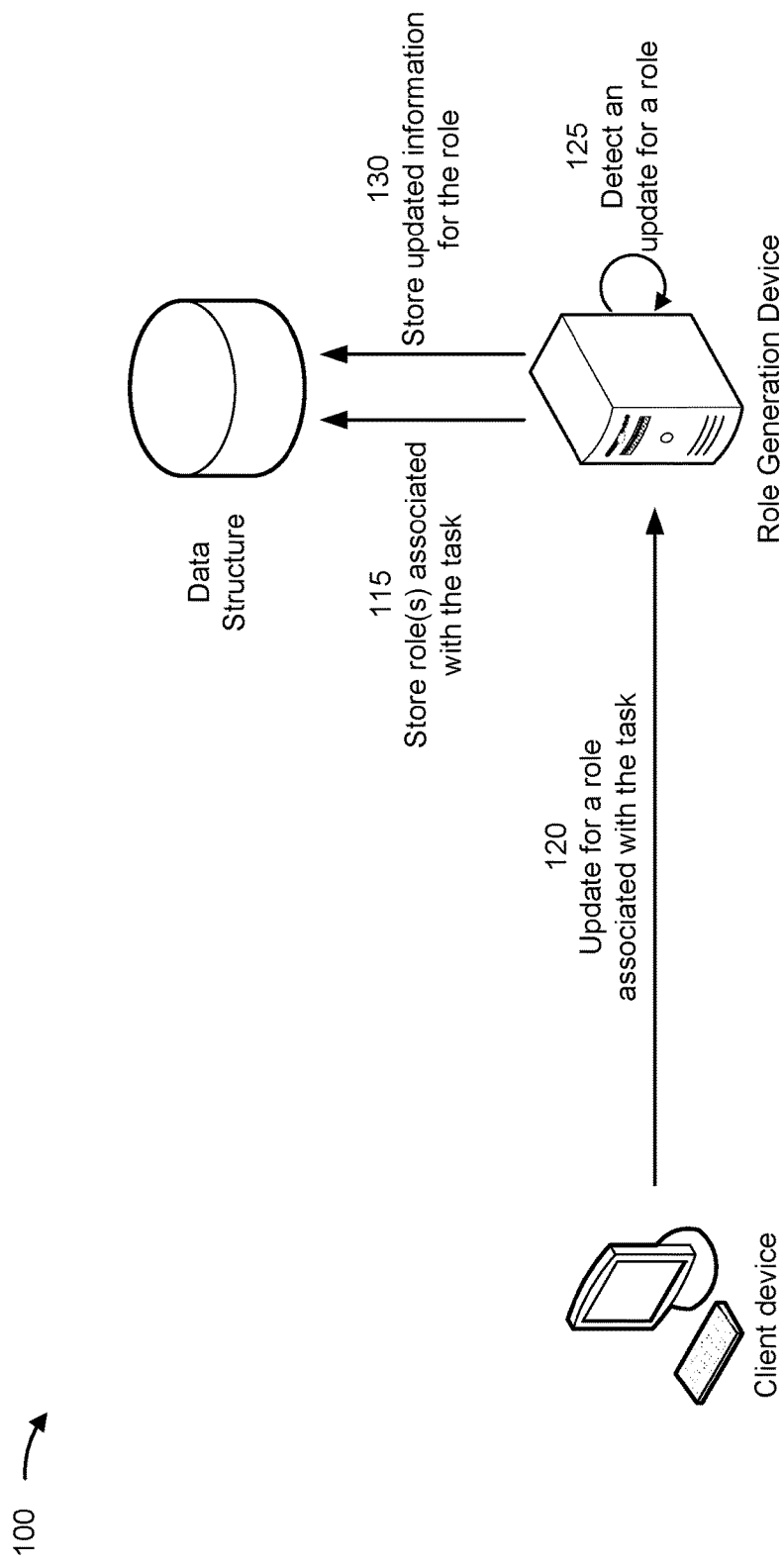
Figure 1C:
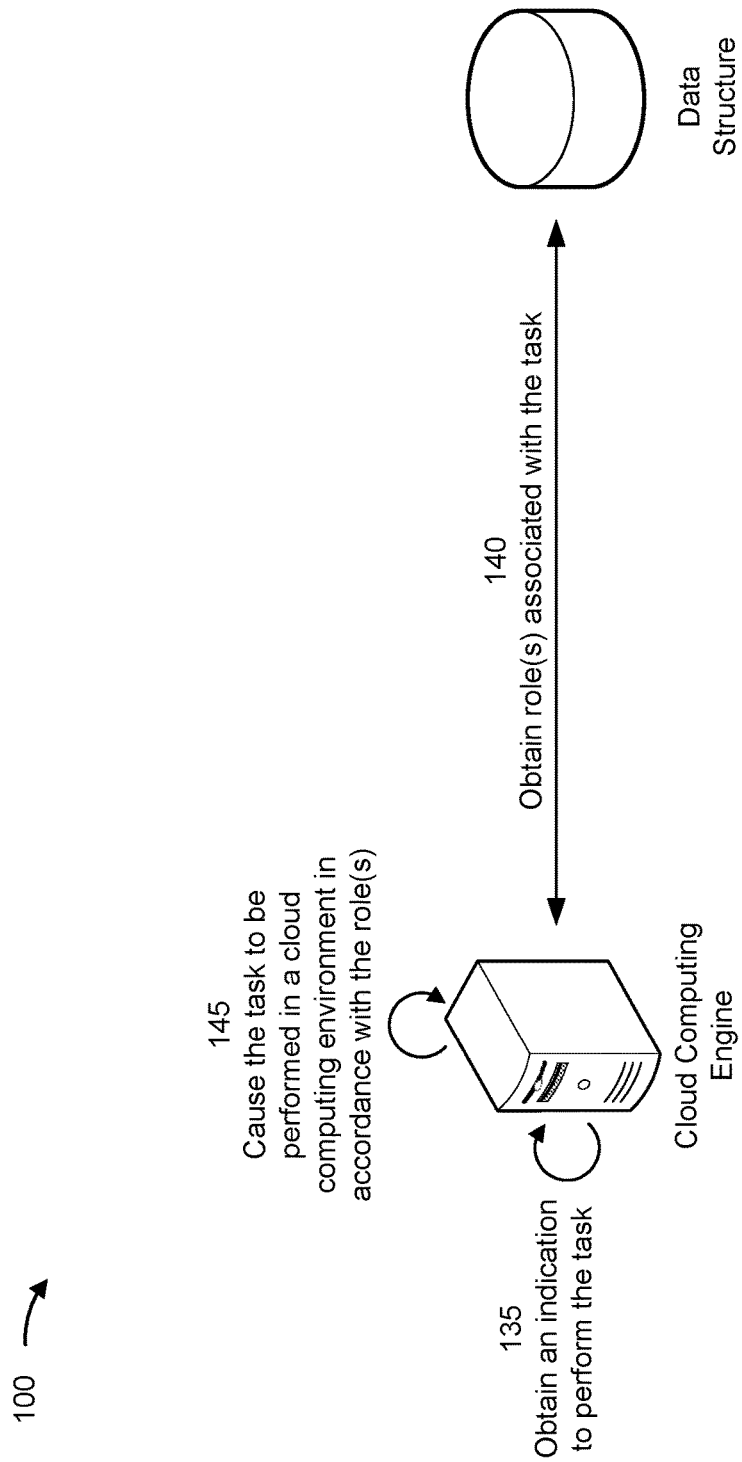

FIGS. 1A-1C are diagrams of an example 100 associated with dynamic and secure permission role generation for cloud computing environments. As shown in FIGS. 1A-1C, example 100 includes a role generation device, a client device, a data structure, and a cloud computing engine. These devices are described in more detail in connection with FIGS. 2 and 3.

As shown in FIG. 1A, the role generation device may dynamically create and/or update one or more security roles, permissions, and/or policies, among other examples, associated with a task. In some implementations, the task may be associated with deploying (e.g., spinning up) infrastructure associated with the cloud computing environment. Deploying infrastructure may refer to the process of creating and configuring resources, such as virtual machines, storage, and networking, to support the deployment of an application or service. As another example, the task may be a repeatable task or a task that is periodically performed, such as a batch-type task, a task associated with a lambda function, and/or another cloud computing task. For example, the task described herein may be any cloud computing task that is associated with a role, such as an IAM role.

In some implementations, a role (e.g., an IAM role) may be associated with a task by the role generation device. The role may be associated with a rule set indicating one or more security permissions associated with performing the task. For example, the rule set may indicate one or more permissions. A permission may indicate one or more resources and/or services, associated with a cloud computing environment (e.g., associated with the cloud computing engine), that are permitted to be accessed when performing the task. The one or more resources and/or services may include an instance, a virtual machine, a container, a function (e.g., a lambda function), a bucket, and/or another resource or service associated with a cloud computing environment. The one or more security roles, permissions, and/or policies, among other examples, associated with the task generated by the role generation device may be least privilege (e.g., may grant access only to resources and/or services needed to perform the task).

For example, as shown by reference number 105, the role generation device may obtain a deployment pattern associated with the task. In some implementations, the deployment pattern may be based on one or more previous occurrences associated with the task. For example, the role generation device may obtain information associated with the one or more previous occurrences associated with the task as performed via the cloud computing engine. The information may include one or more indicated roles (e.g., IAM roles) associated with the previous occurrences, one or more cloud computing resources used to perform the previous occurrences, one or more cloud computing services used to perform the previous occurrences, one or more accounts associated with the previous occurrences, and/or a time at which the previous occurrences of the task were performed, among other examples.

Additionally, or alternatively, the role generation device may obtain, and a client device may provide, information associated with the deployment pattern. For example, the information from the client device may include one or more indicated roles (e.g., IAM roles) associated with the task (e.g., a template IAM role or template permissions associated with the task), one or more security permissions associated with the deployment pattern and the task, one or more cloud computing resources available or permitted to be accessed for performing the task, and/or one or more cloud computing services available or permitted to be accessed for performing the task, among other examples. For example, the client device may provide, and the role generation device may obtain, a user input indicating the information associated with the deployment pattern of the task. In other words, the user input may indicate one or more permissions and/or one or more roles (e.g., IAM roles) associated with the task.

As described elsewhere herein, a role (e.g., an IAM role) may include a set of policies (e.g., written in JavaScript object notation (JSON) or another format) specifying the permissions that are allowed or denied for the task. The policies may be attached to a role and may define what actions an account, application, or service can perform in association with the task, as well as which resources the account, application, or service can access in association with the task. A permission (e.g., a security permission) may refer to a level of access that an account, application, and/or system has to specific resources or services in a cloud computing environment. A permission may include the ability to read, write, or execute specific files or folders, access specific network resources, and/or make changes to the configuration of cloud-based systems, among other examples. Permissions may be controlled through a combination of access control lists (ACLs) and role-based access control (RBAC) systems.

In some implementations, a role (e.g., an IAM role) may include one or more policies (e.g., security policies). A security policy may include one or more permissions. Additionally, or alternatively, a security policy may include a set of rules and guidelines that define how data, resources, and/or services are protected and managed within a cloud computing environment. The security policies may be designed to ensure the confidentiality, integrity, and/or availability of data and systems and to help protect against unauthorized access, misuse, and/or disruption, among other examples. A security policy may include information associated with access control and authentication, encryption and data protection, network and infrastructure security, incident response and disaster recovery information, and/or compliance and regulatory requirement, among other examples.

As shown by reference number 110, the role generation device may determine or generate one or more roles (e.g., one or more IAM roles) for the task based on the deployment pattern. For example, the one or more roles may be least privilege roles. For example, based on the information associated with the deployment pattern, the role generation device may determine what resources and/or services (e.g., associated with the cloud computing engine) are needed to perform the task. The role generation device may generate a role (e.g., an IAM role) for the task that only allows access to the resources and/or services that are needed to perform the task.

For example, the role generation device may analyze the deployment pattern to determine the resources and/or services (e.g., associated with the cloud computing engine) that are needed to perform the task. In some implementations, the role generation device may analyze one or more previous task occurrences to identify resources and/or services (e.g., associated with the cloud computing engine) that were actually used to perform the task during the one or more previous task occurrences. The role generation device may create a role (e.g., an IAM role) that grants permissions to access the resources and/or services (e.g., associated with the cloud computing engine) that were actually used to perform the task during the one or more previous task occurrences.

In other words, the role generation device may generate or create a role (e.g., an IAM role) that indicates one or more security permissions. The one or more security permissions may be associated with controlling access to one or more resources and/or one or more services associated with the cloud computing environment for performing the task. The role generation device may create the security permissions to allow access to the one or more resources and/or the one or more services based on the deployment pattern indicating that the one or more previous occurrences of the task are associated with the one or more resources and/or the one or more services.

In some implementations, the role generation device may analyze the deployment pattern to determine resources and/or services (e.g., associated with the cloud computing engine) used to perform the task within a given time period. For example, the role generation device may identify resources and/or services (e.g., associated with the cloud computing engine) that were used for one or more previous task occurrences that occurred during the given time period (e.g., in a previous X hours, days, or weeks from a time at which the role generation device is generating the one or more roles from the task). Identifying resources and/or services that were more recently used to perform the task may improve a likelihood that the resources and/or services are actually needed to perform the task because more recent task occurrences may be more aligned with current needs and/or procedures for performing the task.

In some implementations, the role generation device may analyze the deployment pattern to determine resources and/or services (e.g., associated with the cloud computing engine) used to perform the task in a quantity of previous task occurrences. In some implementations, the role generation device may determine that a resource or service is to be accessible as indicated by a least privilege role if the quantity of previous task occurrences (e.g., which used the resource or service to perform the task) satisfies a threshold. Identifying resources and/or services that were used more often or frequently to perform the task may improve a likelihood that the resources and/or services are actually needed to perform the task.

Additionally, or alternatively, the role generation device may generate the one or more roles associated with the task based on information indicated by the client device. For example, the client device may indicate one or more permissions and/or one or more security policies to be associated with a least privilege role for the task. The role generation device may create a role (e.g., an IAM role) that grants permissions to access the resources and/or services (e.g., associated with the cloud computing engine) indicated by the one or more permissions and/or one or more security policies obtained from the client device (e.g., obtained via a user input).

In some implementations, the information indicated by the client device may include an indication of one or more resources and/or services associated with the cloud computing engine that are not to be accessible for performing the task. The role generation device may generate a role (e.g., an IAM role) for the task that does not grant permission to access those one or more resources and/or services. For example, even if a deployment pattern indicates that a service or resource was accessed during a previous task occurrence, if that service or resource is indicated as being inaccessible while performing the task by the client device, then the role generation device may generate a role (e.g., an IAM role) for the task that does not grant permission to access that service or resource.

As shown in FIG. 1B, and by reference number 115, the role generation device may store, in the data structure, the one or more roles (e.g., least privilege IAM roles) associated with the task. For example, the role generation device may cache the one or more roles associated with the task in the data structure (e.g., the data structure may be included in a cache memory or may be a cache data structure). In some implementations, the data structure may be stored in a cloud computing environment. Alternatively, the data structure may be stored in memory that is separate from, or not included in, the cloud computing environment.

In some implementations, the role generation device may cause the one or more roles associated with the task to be stored in the data structure for an amount of time or a duration. For example, the role generation device may generate the one or more roles to be associated with the duration. The duration may indicate an amount of time for which the one or more roles are valid. For example, the role generation device may delete or remove the one or more roles (e.g., the one or more least privilege IAM roles) from the data structure after an amount of time (e.g., an amount of time from the time at which the one or more roles were initially stored in the data structure). For example, the amount of time may be the amount of time for which the one or more roles are valid.

Causing the one or more roles to be associated with a limited duration improves the security associated with access to the cloud computing environment because different resources and/or services may be needed for performing the task over time. For example, at a first time a resource or service may be needed to perform the task. However, at a second (e.g., later) time, the resource or the service may no longer be needed to perform the task. If the one or more roles (e.g., that grant access to the resource or service) are indefinitely stored in the data structure, then an occurrence of the task at, or after, the second time may grant access to resources or services that are not actually needed to perform the task.

Additionally, causing the one or more roles to be associated with a limited duration improves an accuracy of the resources and/or services that are granted via the one or more roles. For example, at a first time, one or more resources or services may be needed to perform the task. However, at a second (e.g., later) time, an additional resource or service may be needed to perform the task. If the one or more roles (e.g., that grant access to the resource or service) are indefinitely stored in the data structure, then an occurrence of the task at, or after, the second time may not grant access to the additional resource or service that is actually needed to perform the task, which may result in the task not being performed and/or only partially being performed. This may consume processing resources, computing resources, and/or network resources attempting to perform the task using a role (e.g., an IAM role) that does not grant access to all resources or services needed to perform the task. Thereby, by removing or invaliding the one or more roles after an amount of time (e.g., and subsequently re-generating the one or more roles in a similar manner as described above), the role generation device may conserve processing resources, computing resources, and/or network resources that would have otherwise been used attempting to perform the task using a role (e.g., an IAM role) that does not grant access to all resources or services needed to perform the task.

In some implementations, as shown by reference number 120, the client device may provide, and the role generation device may obtain, an indication of an update for a role associated with the task. For example, the client device may provide an update to one or more security permissions and/or one or more security policies, among other examples, associated with the task. The update to the one or more security permissions and/or one or more security policies may indicate one or more resources and/or one or more services that are requested to be added to allowed or accessible resources and/services associated with the task. Additionally, or alternatively, the update to the one or more security permissions and/or one or more security policies may indicate one or more resources and/or one or more services that are requested to be removed from allowed or accessible resources and/or services associated with the task.

As shown by reference number 125, the role generation device may detect an update for the role associated with the task. In some implementations, the role generation device may detect the update based on obtaining an indication of the update from the client device (e.g., as described above). Additionally, or alternatively, the role generation device may detect the update based on analyzing the deployment pattern associated with the task. For example, the role generation device may detect that a given resource or a given service has not been used to perform the task for a period of time and/or in a last M occurrences of the task.

For example, the role generation device may determine that an amount of time from a last time at which a given resource or a given service was used to perform the task satisfies a time threshold. Additionally, or alternatively, the role generation device may determine that a quantity of occurrences of the task that are not associated with a given resource or a given service satisfies an occurrence threshold. The quantity of occurrences may be a quantity of consecutive occurrences and/or a quantity of occurrences within a given time window (e.g., a sliding time window). As a result, the role generation device may determine that access to the given resource or the given service should be removed for performing the task. The role generation device may update one or more security permissions and/or security policies associated with the role to indicate that the given resource or the given service is not accessible when the task is being performed.

As shown by reference number 130, the role generation device may update, in the data structure, information associated with the role (e.g., the least privilege IAM role) to indicate the one or more updated security permissions and/or updated security policies. For example, the role generation device may enable access to one or more resources and/or one or more services associated with the task by updating the one or more security permissions and/or security policies in the data structure. Additionally, or alternatively, the role generation device may remove access to one or more resources and/or one or more services associated with the task by updating the one or more security permissions and/or security policies in the data structure. This enables the role generation device to dynamically update and/or modify roles (e.g., IAM roles) associated with the task over time. This improves security associated with the task and the cloud computing environment. Further, this improves a likelihood that the roles (e.g., IAM roles) grant access to all resources or services needed to perform the tasks while also ensuring that the roles are least privilege roles.

As shown in FIG. 1C, and by reference number 135, the cloud computing engine may obtain an indication to perform the task. For example, the cloud computing engine may be associated with, or may support, a serverless computing engine or a serverless cloud computing framework. A serverless framework may be a way to build and run applications and services without having to manage infrastructure. This is achieved by using a combination of cloud services, such as function-as-a-service (FaaS) and backend-as-a-service (BaaS), which allow developers to write and deploy code without handling the underlying servers and infrastructure. A cloud provider may be responsible for managing and scaling the servers for the user in a serverless framework. A user (e.g., via a client device) may simply write and upload code, and the cloud provider may automatically run and scale infrastructure in response to incoming requests. This eliminates the need for the user to provision and manage servers, thereby reducing costs and complexity. In addition to FaaS and BaaS, a serverless framework may also include other cloud services such as storage, databases, and/or messaging queues, among other examples.

An example of a serverless computing engine may be an engine that executes and/or manages containers without having to provision and manage the underlying infrastructure, such as Amazon Elastic Container Service (ECS) Fargate, among other examples. For example, when a task associated with the serverless computing engine is executed, a cloud provider may provision the necessary resources and run the container(s) associated with the task. For example, a task associated with the serverless computing engine may be a unit of work that allows containers to be executed on the serverless compute engine without provisioning and managing underlying infrastructure. This reduces costs and reduces complexity associated with performing the task.

For example, the cloud computing engine may be associated with a unit of work that is associated with deploying a container that is associated with performing the task (e.g., the task for which the one or more roles were generated). The container and the serverless computing engine may be associated with a cluster (e.g., an ECS cluster) in the cloud computing environment. In some implementations, the client device may provide, and the cloud computing engine may obtain, the indication to perform the task. In other examples, the cloud computing engine may be configured to perform the task at certain times.

As shown by reference number 140, the cloud computing engine may obtain the one or more roles associated with the task based on obtaining the indication to perform the task. In other words, the one or more roles (e.g., one or more least privilege IAM roles) may be dynamically retrieved each time the task is performed by the cloud computing engine. In some implementations, the cloud computing engine may obtain the one or more roles from the data structure. In other examples, the cloud computing engine may provide, and the role generation device may obtain, a request for the one or more roles associated with the task. In such examples, the role generation device may obtain the one or more roles from the data structure and may provide the one or more roles to the cloud computing engine.

For example, the cloud computing engine and/or the role generation device may search or query the data structure for roles associated with the task. For example, the cloud computing engine and/or the role generation device may search, based on receiving the indication to perform the task, the data structure using an identifier associated with the task. The cloud computing engine and/or the role generation device may obtain, based on searching the data structure, information associated with the one or more roles (e.g., one or more least privilege roles) associated with the task. In some implementations, the role generation device may provide, to the cloud computing engine, the information associated with the one or more roles.

As shown by reference number 145, the role generation device and/or the cloud computing engine may cause the task to be performed in the cloud computing environment in accordance with the one or more roles that are associated with the task. For example, the cloud computing engine may, based on obtaining the one or more roles, deploy a container that includes the one or more roles. The container may utilize the one or roles to perform the task using a cloud computing resource and/or service. For example, the role generation device and/or the cloud computing engine may cause the task to be performed using allowable resources and/or services in the cloud computing environment as indicated by the one or more roles.

As a result, the role generation device and/or the cloud computing engine conserve processing resources, network resources, computing resources, and/or memory resources, among other examples, that would have otherwise been used for creating, generating, and/or communicating one or more security permissions and/or IAM role for each session associated with a cloud computing environment. Additionally, the systematic generation of a role by the role generation device ensures that only least privileges are granted for the role. Because the role generation device may store the role(s) to be made available each time the task is requested to be performed, the role generation device may ensure that least privileges are granted for performing the task each time the task is performed. This improves security associated the task and/or the cloud computing environment because the role generation device may ensure that permissions and/or control access are not granted for performing a task that are not actually needed for performing that task.

As indicated above, FIGS. 1A-1C are provided as an example. Other examples may differ from what is described with regard to FIGS. 1A-1C.

Figure 2:
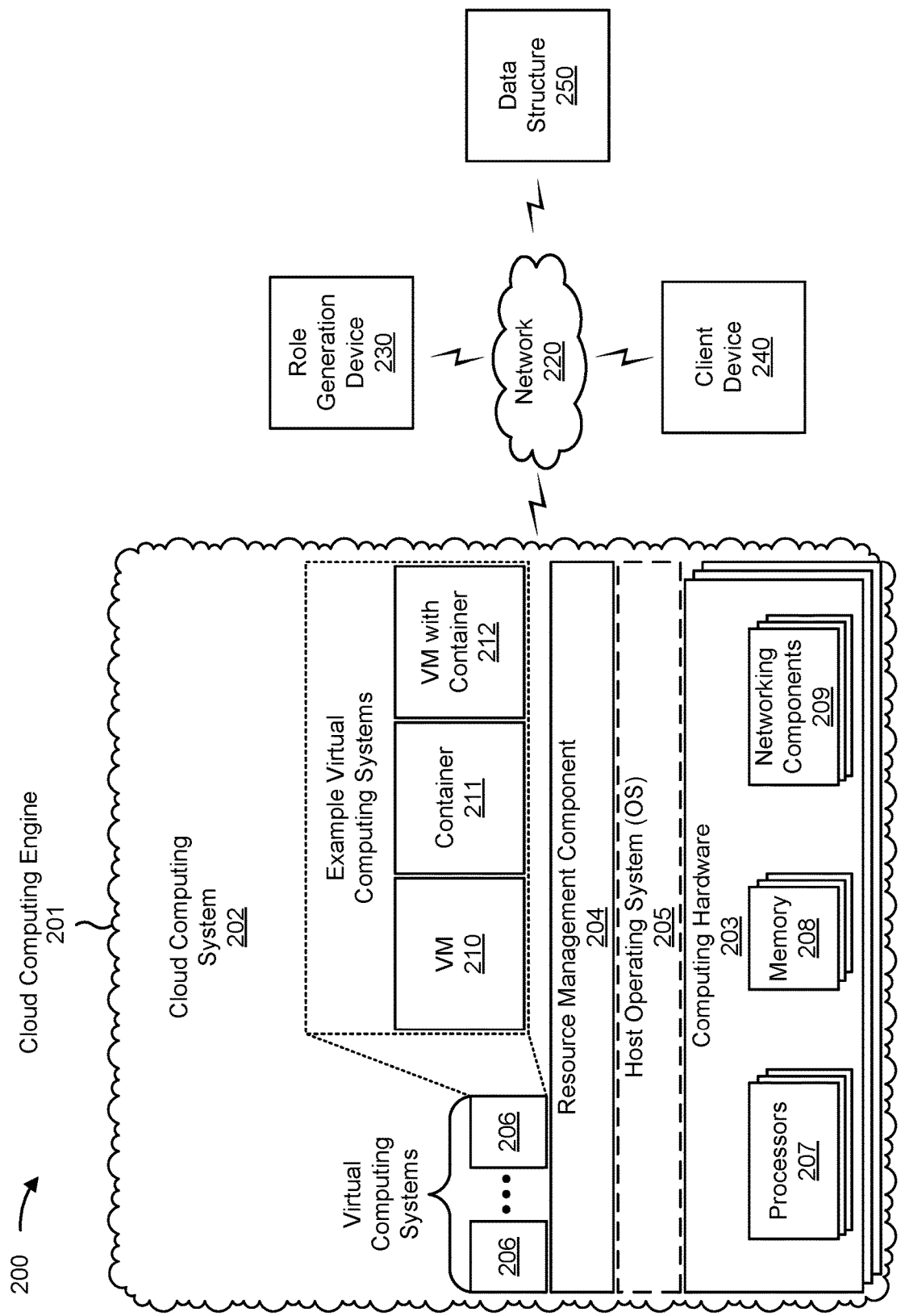
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a cloud computing engine 201, which may include one or more elements of and/or may execute within a cloud computing system 202. The cloud computing system 202 may include one or more elements 203-212, as described in more detail below. As further shown in FIG. 2, environment 200 may include a network 220, a role generation device 230, and/or a client device 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A container 211 may include an environment associated with executing an application in the cloud computing system 202. For example, a container 211 may include application code, runtime, system tools, libraries, and/or settings, among other examples, associated with executing an application. In some implementations, each container 211 may be associated with a dedicated file system, network interfaces, and/or process namespace, among other examples. Containers 211 and virtual machines 210 may provide isolation and abstraction for applications. In some implementations, a container 211 may be referred to as a Docker container, such as when a container 211 utilizes Docker as a containerization platform. A virtual machine 210 may be associated with a full copy of a host operating system (e.g., the host operating system 205) to enable the virtual machine 210 to operate. A container 211 may share a host operating system kernel with the cloud computing system 202 and may only include the software libraries and dependencies needed to run an application (e.g., enabling the container 211 to be smaller in size than a virtual machine 210 and to stop and/or start operations faster than a virtual machine 210).

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud computing engine 201 may include one or more elements 203-212 of the cloud computing system 202, may execute within the cloud computing system 202, and/or may be hosted within the cloud computing system 202, in some implementations, the cloud computing engine 201 may not be cloud-based (e.g., may be implemented outside of a cloud computing system) or may be partially cloud-based. For example, the cloud computing engine 201 may include one or more devices that are not part of the cloud computing system 202, such as device 300 of FIG. 3, which may include a standalone server or another type of computing device. The cloud computing engine 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The role generation device 230 may include one or more devices capable of receiving, generating, storing, processing, providing, and/or routing information associated with permission role generation for cloud computing environments, such as the cloud computing engine 201, as described elsewhere herein. The role generation device 230 may include a communication device and/or a computing device. For example, the role generation device 230 may include a server, such as an application server, a client server, a web server, a database server, a host server, a proxy server, a virtual server (e.g., executing on computing hardware), or a server in a cloud computing system. In some implementations, the role generation device 230 may include computing hardware used in a cloud computing environment, such as the cloud computing engine 201.

The client device 240 may include one or more devices capable of receiving, generating, storing, processing, and/or providing information associated with permission role generation for cloud computing environments, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data structure 250 may include one or more devices capable of receiving, generating, storing, processing, and/or providing information associated with permission role generation for cloud computing environments, as described elsewhere herein. The data structure 250 may include a communication device and/or a computing device. For example, the data structure 250 may include a data structure, a cache, a database, a data source, a server, a database server, an application server, a client server, a web server, a host server, a proxy server, a virtual server (e.g., executing on computing hardware), a server in a cloud computing system, a device that includes computing hardware used in the cloud computing environment 200, or a similar type of device. As an example, the data structure 250 may store dynamically created roles (e.g., IAM roles) associated with respective tasks to be performed via the cloud computing engine 201, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
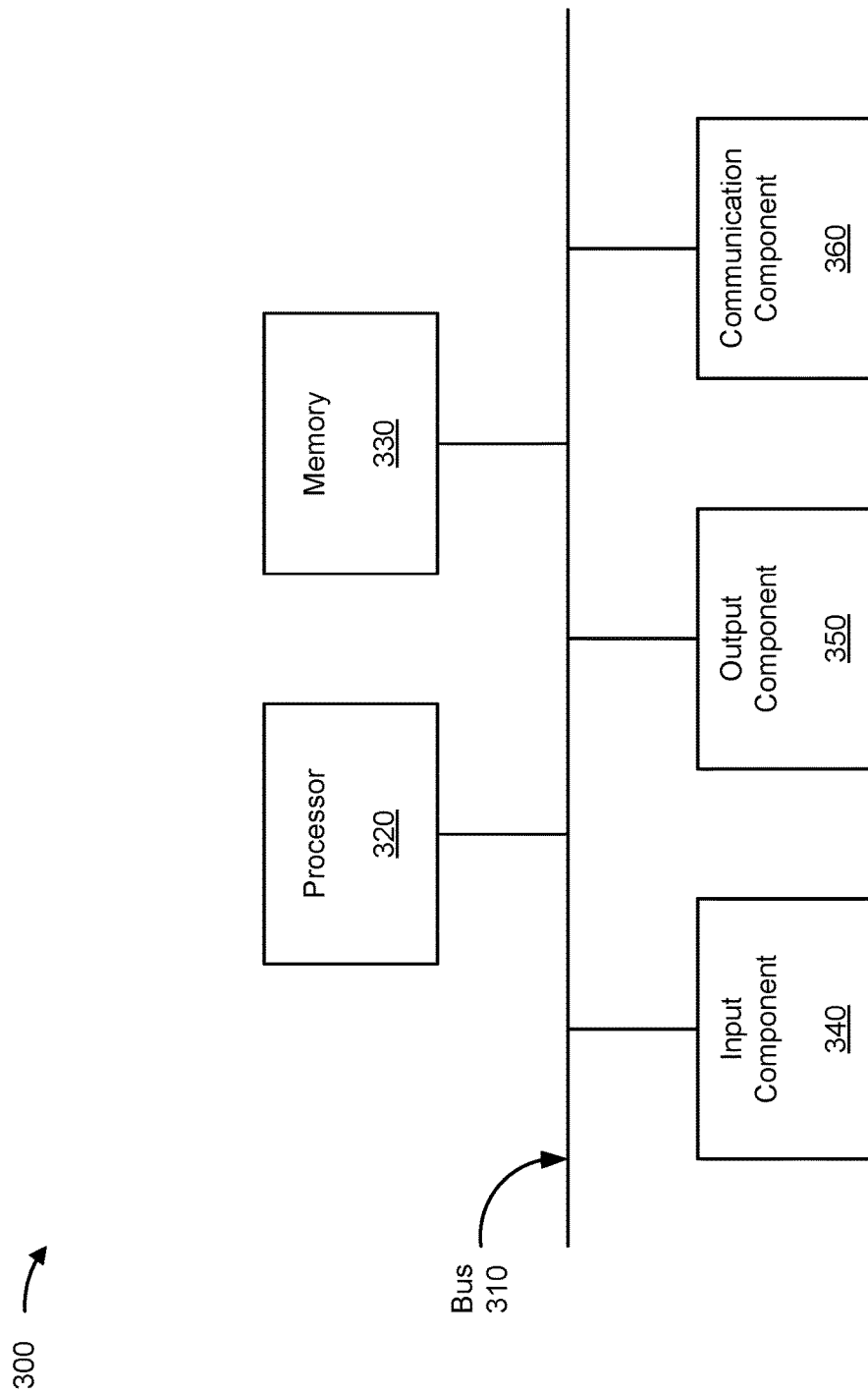
FIG. 3 is a diagram of example components of a device associated with dynamic and secure permission role generation for cloud computing environments, in accordance with some embodiments of the present disclosure.

FIG. 3 is a diagram of example components of a device 300 associated with dynamic and secure permission role generation for cloud computing environments. The device 300 may correspond to the cloud computing system 202 (and/or one or more devices or components of the cloud computing system 202), the role generation device 230, and/or the client device 240. In some implementations, the cloud computing system 202 (and/or one or more devices or components of the cloud computing system 202), the role generation device 230, and/or the client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
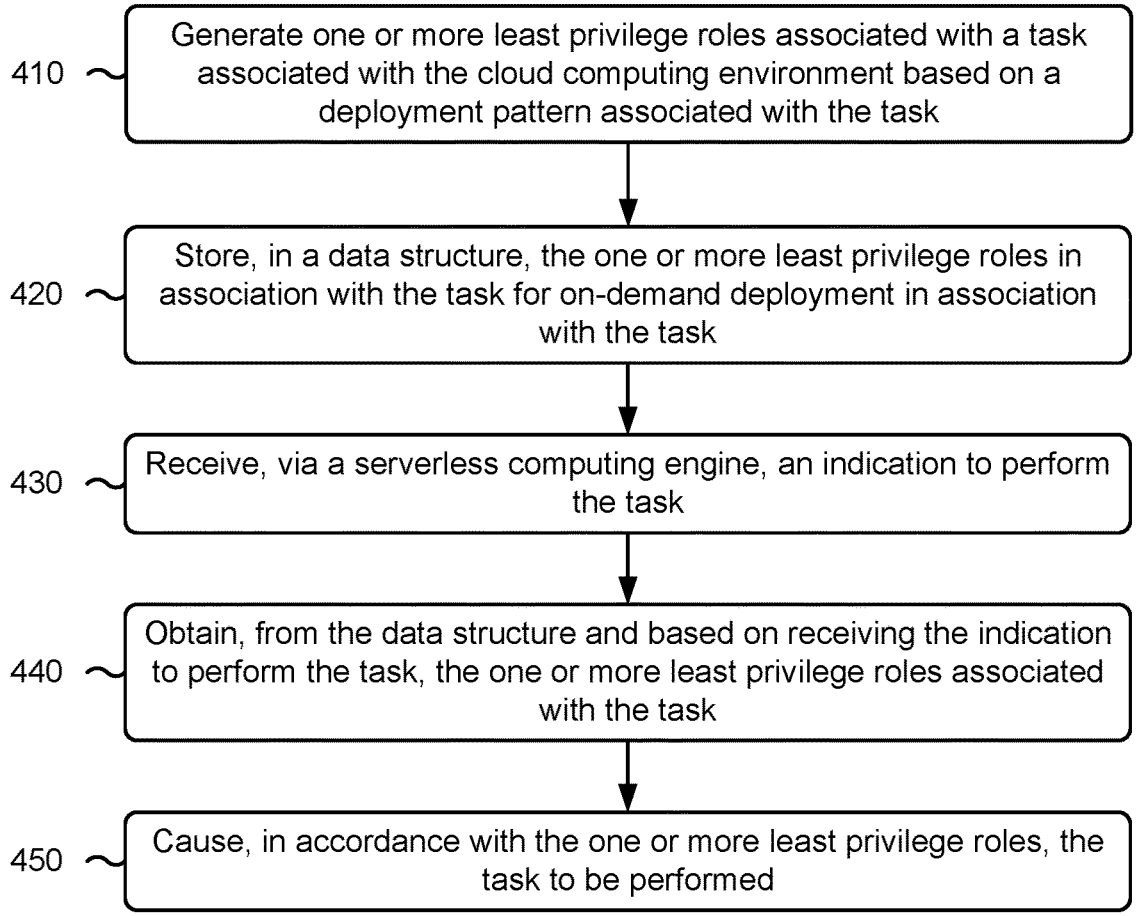
FIG. 4 is a flowchart of an example process associated with dynamic and secure permission role generation for cloud computing environments, in accordance with some embodiments of the present disclosure.

FIG. 4 is a flowchart of an example process 400 associated with dynamic and secure permission role generation for cloud computing environments. In some implementations, one or more process blocks of FIG. 4 may be performed by the role generation device 230. In some implementations, one or more process blocks of FIG. 4 may be performed by another device or a group of devices separate from or including the role generation device 230, such as the cloud computing engine 201, the cloud computing system 202, the client device 240, and/or the data structure 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include generating one or more least privilege roles associated with a task associated with the cloud computing environment based on a deployment pattern associated with the task (block 410). For example, the role generation device 230 (e.g., using processor 320 and/or memory 330) may generate one or more least privilege roles associated with a task associated with the cloud computing environment based on a deployment pattern associated with the task. In some implementations, the one or more least privilege roles are associated with a rule set indicating one or more security permissions associated with performing the task. In some implementations, the deployment pattern indicates one or more previous occurrences of the task and the one or more least privilege roles are based on resources or actions associated with the one or more previous occurrences, as described above in connection with reference number 110 of FIG. 1A. As an example, the one or more least privilege roles may be IAM roles that indicate one or more resources and/or one or more services that are accessible when performing the task in the cloud computing environment. For example, the one or more resources and/or one or more services may include only resources and/or services needed (e.g., necessary) for performing the task.

As further shown in FIG. 4, process 400 may include storing, in a data structure, the one or more least privilege roles in association with the task for on-demand deployment in association with the task (block 420). For example, the role generation device 230 (e.g., using processor 320 and/or memory 330) may store, in a data structure, the one or more least privilege roles in association with the task for on-demand deployment in association with the task, as described above in connection with reference number 115 of FIG. 1B. As an example, the role generation device may cache the one or more least privilege roles in the data structure.

As further shown in FIG. 4, process 400 may include receiving, via a serverless computing engine, an indication to perform the task (block 430). For example, the role generation device 230 (e.g., using processor 320, memory 330, input component 340, and/or communication component 360) may receive, via a serverless computing engine, an indication to perform the task, as described above in connection with reference number 135 of FIG. 1C. As an example, the serverless computing engine may include a task of the serverless computing engine (e.g., a Fargate task) that is associated with executing and/or creating a container that is associated with performing the task in the cloud computing environment. The serverless computing engine may request roles and/or may query the data structure for roles associated with the task when the serverless computing engine is triggered to perform the task.

As further shown in FIG. 4, process 400 may include obtaining, from the data structure and based on receiving the indication to perform the task, the one or more least privilege roles associated with the task (block 440). For example, the role generation device 230 (e.g., using processor 320 and/or memory 330) may obtain, from the data structure and based on receiving the indication to perform the task, the one or more least privilege roles associated with the task, as described above in connection with reference number 140 of FIG. 1C. As an example, the role generation device may search the data structure using an identifier associated with the task. The role generation device may identify the one or more least privilege roles based on searching the data structure.

As further shown in FIG. 4, process 400 may include causing, in accordance with the one or more least privilege roles, the task to be performed (block 450). For example, the role generation device 230 (e.g., using processor 320 and/or memory 330) may cause, in accordance with the one or more least privilege roles, the task to be performed, as described above in connection with reference number 145 of FIG. 1C. As an example, the role generation device may cause (e.g., based on providing information associated with the one or more least privilege roles) the serverless computing engine (e.g., the cloud computing engine) to deploy a container that is associated with performing the task and that includes the one or more least privilege roles. For example, the cloud computing engine may be configured to cause a software package (e.g., a container) to be deployed using one or more resources or services, associated with the cloud computing environment, that are permitted as defined by the one or more least privilege roles.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamic and secure permission role generation for a cloud computing environment, the system comprising:
   one or more memories; and
   one or more processors, communicatively coupled to the one or more memories, configured to:
   generate one or more least privilege roles associated with a task associated with the cloud computing environment based on a deployment pattern associated with the task,
   wherein the one or more least privilege roles are associated with a rule set indicating one or more security permissions associated with performing the task,
   wherein the deployment pattern indicates one or more previous occurrences of the task, and the one or more least privilege roles are based on resources or actions associated with the one or more previous occurrences;
   store, in a data structure, the one or more least privilege roles in association with the task for on-demand deployment in association with the task;
   receive, via a serverless computing engine, an indication to perform the task;
   obtain, from the data structure and based on receiving the indication to perform the task, the one or more least privilege roles associated with the task; and
   cause, in accordance with the one or more least privilege roles, the task to be performed.

2. The system of claim 1,
   wherein the one or more least privilege roles are associated with one or more identity and access management (IAM) roles.

3. The system of claim 1,
   wherein the one or more security permissions are associated with controlling access to one or more resources or one or more services associated with the cloud computing environment, and
   wherein the deployment pattern indicates that the one or more previous occurrences of the task are associated with the one or more resources or the one or more services.

4. The system of claim 1,
   wherein the one or more processors, to generate the one or more least privilege roles, are configured to:
   receive a user input indicating at least one of the one or more security permissions associated with the deployment pattern and the task.

5. The system of claim 1,
   wherein the one or more least privilege roles are associated with a duration, and wherein the one or more processors are further configured to:
   delete the one or more least privilege roles from the data structure after an amount of time indicated by the duration.

6. The system of claim 1,
   wherein the one or more processors, to cause the task to be performed, are configured to:
   deploy a container associated with the serverless computing engine and the task,
   wherein the container includes information indicating the one or more least privilege roles, and
   wherein the container is configured to cause the task to be performed in accordance with the one or more least privilege roles.

7. The system of claim 1,
wherein the one or more processors are further configured to:
search, based on receiving the indication to perform the task, the data structure using an identifier associated with the task;
obtain, based on searching the data structure, information associated with the one or more least privilege roles; and
provide, to the serverless computing engine, the information associated with the one or more least privilege roles.

8. The system of claim 1,
wherein the task is associated with deploying infrastructure associated with the cloud computing environment.

9. A method for dynamic and secure permission role generation for a cloud computing environment, comprising:
generating, by a device and based on a deployment pattern associated with a task that is associated with the cloud computing environment, one or more least privilege identity and access management (IAM) roles associated with the task,
wherein the one or more least privilege IAM roles indicate one or more security permissions associated with performing the task, and
wherein the deployment pattern indicates one or more of, one or more previously accessed resources or one or more previously accessed services, in the cloud computing environment, that were previously accessed during one or more previous occurrences of the task;
storing, by the device and in a data structure, the one or more least privilege IAM roles in association with the task for on-demand deployment in association with the task;
receiving, by the device, an indication to perform the task;
obtaining, from the data structure and based on receiving the indication to perform the task, the one or more least privilege IAM roles associated with the task; and
causing, by the device and in accordance with the one or more least privilege IAM roles, the task to be performed in the cloud computing environment.

10. The method of claim 9,
wherein the one or more least privilege IAM roles indicate one or more resources or one or more services, associated with the cloud computing environment, that are needed to perform the task based on the deployment pattern, and
wherein the one or more least privilege IAM roles are configured to cause only the one or more resources or the one or more services to be available when performing the task.

11. The method of claim 9, further comprising:
receiving an indication of an update associated with a least privilege IAM role, from the one or more least privilege IAM roles, indicating one or more updated security permissions associated with the least privilege IAM role; and
updating, in the data structure, information associated with the least privilege IAM role to indicate the one or more updated security permissions.

12. The method of claim 9,
wherein the data structure is a cache data structure.

13. The method of claim 9,
wherein generating the one or more least privilege IAM roles comprises:
analyzing the deployment pattern to identify one or more resources or one or more services, associated with the cloud computing environment, that are associated with performing the task,
wherein the one or more security permissions indicate that the one or more resources or the one or more services are permitted to be used in connection with performing the task.

14. The method of claim 9, further comprising:
removing the one or more least privilege IAM roles from the data structure after an amount of time.

15. The method of claim 9,
wherein performing the task comprises:
creating, via a serverless cloud computing engine, a unit of work that is executable by the serverless cloud computing engine to cause the task to be performed in accordance with the one or more least privilege IAM roles.

16. The method of claim 15,
wherein the unit of work is configured to cause a software package to be deployed using one or more resources or services, associated with the cloud computing environment, that are permitted as defined by the one or more least privilege IAM roles.

17. A non-transitory computer-readable medium storing a set of instructions, the set of instructions comprising:
one or more instructions that, when executed by one or more processors of a device, cause the device to:
generate one or more roles associated with a task associated with a cloud computing environment based on a deployment pattern associated with the task,
wherein the one or more roles are one or more least privilege roles associated with controlling access to one or more resources or one or more services associated with the cloud computing environment, and
wherein the deployment pattern indicates one or more of, one or more previously accessed resources or one or more previously accessed services, in the cloud computing environment, that were previously accessed during one or more previous occurrences of the task;
cache, in a data structure, the one or more roles in association with the task;
receive, via a serverless computing engine, an indication to perform the task;
obtain, from the data structure and based on receiving the indication to perform the task, the one or more roles associated with the task; and
provide, to the serverless computing engine, an indication of the one or more roles to cause the task to be performed in accordance with the one or more roles.

18. The non-transitory computer-readable medium of claim 17,
wherein the one or more least privilege roles are identity and access management (IAM) roles that grant a minimum degree of access necessary for a user or a system to perform a specific task or a specific function.

19. The non-transitory computer-readable medium of claim 17,
wherein the one or more instructions are further configured to cause the device to:
deploy a container associated with the serverless computing engine and the task, wherein the container includes information indicating the one or more roles, and
wherein the container is configured to cause the task to be performed in accordance with the one or more roles.

20. The non-transitory computer-readable medium of claim 17,
wherein the task is associated with at least one of:
deploying infrastructure associated with the cloud computing environment,
a lambda function, or
a cloud computing task.

\* \* \* \* \*